(No Model.)
C. P. BROWN.
FLUME GATE.
No. 554,768.  Patented Feb. 18, 1896.
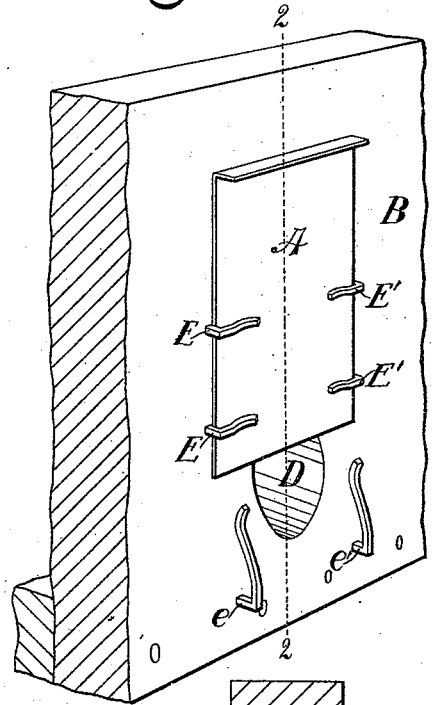
Fig. 1
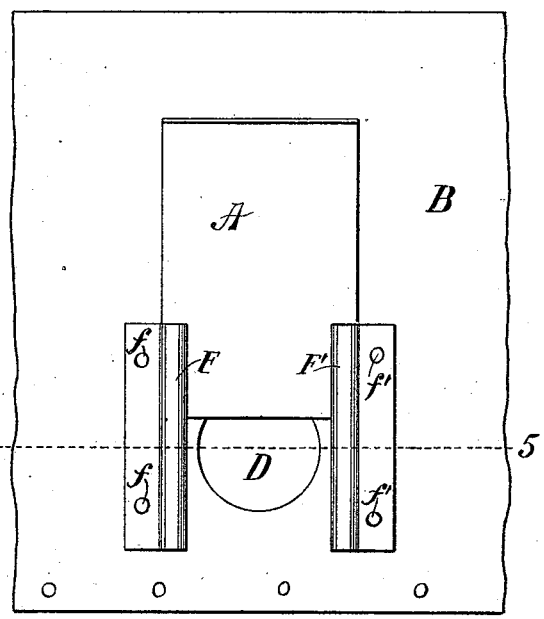
Fig. 4
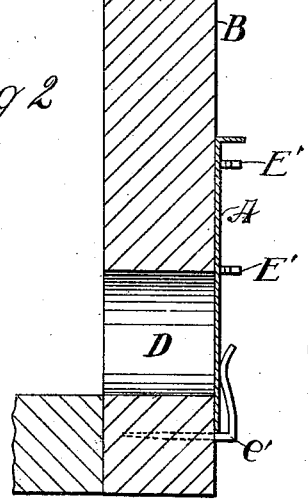
Fig. 2
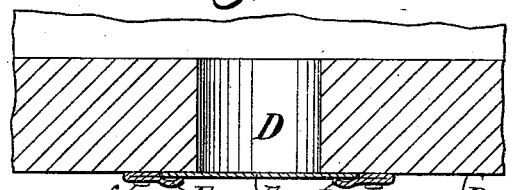
Fig. 5
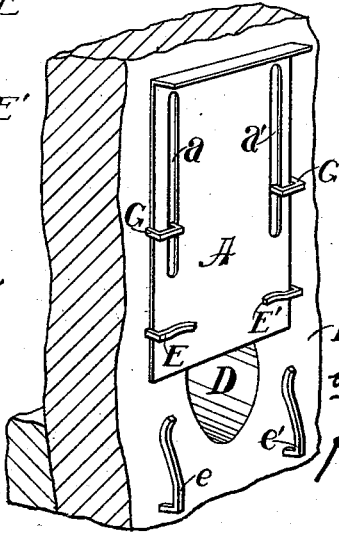
Fig. 3
Fig. 6
Witnesses:
F. T. Johnston.
Alfred T. Townsend.
Inventor:
Christen P. Brown
by
Hazard & Townsend
His Attys

UNITED STATES PATENT OFFICE.

CHRISTEN P. BROWN, OF REDLANDS, CALIFORNIA.

FLUME-GATE.

SPECIFICATION forming part of Letters Patent No. 554,768, dated February 18, 1896.

Application filed October 11, 1895. Serial No. 565,382. (No model.)

*To all whom it may concern:*

Be it known that I, CHRISTEN P. BROWN, a citizen of the United States, residing at Redlands, in the county of San Bernardino and State of California, have invented new and useful Improvements in Flume - Gates, of which the following is a specification.

In Southern California, where irrigation is much practiced, great difficulty is experienced with the gates which are used to allow the water to discharge from the irrigation-flume into the irrigating-furrows by reason of the tendency of such gates to leak. It must be understood that in irrigating it is customary to provide a head flume at the upper end of each orchard or tract of land to be irrigated, and to provide in such flume small gates arranged at intervals therealong to allow the discharge of water from the flume into the furrows. It is essential that such gates be cheap, and it is also essential that they close tightly in order to prevent waste of water and also to prevent leakage of water from the flume upon cultivated ground which it is not desired to irrigate at the time when it is desired to irrigate other portions of the tract lying under the same flume. When water thus escapes upon cultivated ground which has no irrigating-furrows provided therein, the result is that the ground is flooded and becomes packed and must, at considerable labor and expense, be thoroughly cultivated and stirred or it will bake and place the ground in bad condition.
The object of my invention is to provide a gate which will be cheap, simple, and durable, not liable to get out of order, and one which will effectually guard against leakage.

The accompanying drawings illustrate my invention.

Figure 1 is a fragmental perspective side view of a flume having one of my improved gates in position thereon. Fig. 2 is a cross-section on line 2 2, Fig. 1. Fig. 3 is a view of my invention showing a modified form of guideway. Fig. 4 is a front elevation of another form of gate. Fig. 5 is a longitudinal section on line 5 5 in Fig. 4. In this view the gate is shown closed. Fig. 6 is a view of one of the angular metal guides.

In flume-gates as heretofore constructed, having guideways rigidly fixed to the flume, it has been customary to make the gate-seat of sheet metal and the gate cannot be perfectly seated upon the seat, wherefore great leakage occurs. It has also been proposed to fasten the gate to a spring-metal arm which is secured to the flume and arranged to swing in the arc of a circle and to hold the gate against the gate-seat and to allow it to be swung from the opening provided in the side of the flume for the escape of the water. This construction has not been satisfactory, for the reason that it is very expensive, liable to get out of order, and, furthermore, in practice it has been found impossible to seat the gate so perfectly that it will not leak without using a spring of such great strength that no fastening which can be quickly and cheaply applied will hold the spring in place upon the flume.

In the drawings, A is the gate, which is arranged to seat upon the side of the flume B, which thus forms a wooden seat for the gate.

D is the opening provided in the flume for the escape of water. Upon each side of this opening, as shown in Fig. 1, I provide guides E E', each made of bent metal and having one end adapted to be driven into the flume and having its other end arranged to guide the gate as it is reciprocated to close and unclose the opening D. Beneath this opening D, I provide two upwardly - projecting spring-metal members and guides e e', which are each bent at an angle and have one end adapted to be driven into the flume and the upper end curved out to form a tongue which guides the gate into position between the arms and the flume. These arms or tongues spring in toward the flume and operate to force the gate firmly against its seat when the gate is closed.

As shown in Figs. 4 and 5, the guideways F and F' are formed of spring-sheet metal and are arranged upon each side of the opening D and form tongues which spring inward to force the gate firmly down upon the seat, as shown in Fig. 5.

By reason of the gate-seat being of wood and becoming saturated when water is in the flume the pressure of the spring-guideways holds the gate so firmly upon its seat that if there should be any slight escape of water between the gate and its seat the sediment carried by the water would very quickly stop such leak. The fibers of the wood engage and retain all sedimentary material and quickly stop any slight leak which might occur. This is never the case where both the gate and its seat are metal.

By reason of the shortness of the spring members which force the gate against its seat such members will withstand all the pressure which can possibly be brought to bear thereagainst when the gate is used as an ordinary open flume. Furthermore, on account of the slight amplitude of motion of the springs which is necessary to cause them to operate effectively, I find it possible to use for this purpose metal not ordinarily classed as "spring" metal. Therefore I wish it to be clearly understood that by "spring" metal I mean any metal having sufficient elasticity for the purpose.

The guide members E E' e e' are made angular in cross-section, in order that when driven into the wood they will not be turned easily from the position which it is desired for them to maintain. However, round ones may be used and a certain degree of effectiveness secured thereby, and I do not limit my invention to any particular shape of guide members.

It will also be understood that my improved gate may be used in cement flumes by securing the gate to a wooden block, such as the fragment of flume shown in Fig. 4, and the block be cemented in position in the cement-work. This construction, however, will be readily understood by those versed in the art and does not require illustration herein.

In practice when the flume is built the gate is placed in position over the outlet D, and, when the form shown in Figs. 1 and 2 is employed, the guides E E' are driven in upon each side of the gate, as shown, and the spring-arms e e' are driven into the wood at the bottom of the gate with their upper ends pressed against the gate to force it firmly against the seat. When the form shown in Figs. 4 and 5 is used, the gate is placed in position over the opening D, and the guideways F and F' are fixed upon each side of the gate by nails f f' driven into the wood, as shown in Fig. 2, and engage the gate and force it firmly upon its seat.

As shown in Fig. 3, the arrangement of the guides is the same as in Figs. 1 and 2, excepting that the gate A is provided on each side with a slot a a', and staples G G' are driven into the flume, each with one member of the staple in a slot and the other member outside of the slot, so that the gate is thus permanently fixed to the flume and is not liable to be accidentally or intentionally removed therefrom and lost.

Now, having described my invention, what I claim as new, and desire to secure by Letters Patent, is—

1. In a flume-gate, the combination of the wooden gate-seat; the gate arranged to seat thereupon; and the spring-tongues fixed to the wooden seat by fastenings driven into the wood, arranged projecting into the path of the gate to serve as guides for the gate and to also engage the gate and press it firmly against the seat when the gate is closed.

2. In a flume-gate, the combination of the gate-seat; the guides each formed of metal bent at an angle, having one end adapted to be driven into the flume and the other end arranged to form in connection with the wall of the flume a guide for the gate; the gate arranged to slide in the guides, and the two spring-metal members arranged below the gate-seat, each bent at an angle and having one end adapted to be driven into the flume and its other end adapted and arranged to extend upward to engage the gate when the gate is closed, and to press it firmly against its seat.

CHRISTEN P. BROWN.

Witnesses:
JAMES F. DRAKE,
CHAS. E. TRUESDELL.